United States Patent [19]

Endo et al.

[11] Patent Number: 5,118,755

[45] Date of Patent: Jun. 2, 1992

[54] ROOM TEMPERATURE-CURABLE POLYORGANOSILOXANE COMPOSITION

[75] Inventors: Isao Endo; Fumihiko Kobayashi, both of Gunma, Japan

[73] Assignee: Toshiba Silicone Co., Ltd., Tokyo, Japan

[21] Appl. No.: 499,741

[22] Filed: Mar. 27, 1990

[30] Foreign Application Priority Data

Mar. 29, 1989 [JP] Japan .................. 1-76914

[51] Int. Cl.$^5$ ................................ C08K 3/10
[52] U.S. Cl. ................... 524/783; 524/413; 528/15; 528/17; 528/18; 528/19
[58] Field of Search .............. 524/413, 783; 528/17, 528/18, 19, 15

[56] References Cited

U.S. PATENT DOCUMENTS 4,657,978  4/1987  Wakabayashi et al. ............ 528/17
5,026,812  6/1991  Geilich .............................. 528/17

Primary Examiner—Melvyn I. Marquis
Attorney, Agent, or Firm—Sughrue, Mion, Zinn, Macpeak & Seas

[57] ABSTRACT

A room temperature-curable polyorganosiloxane composition which can provide a cured elastic product having a smooth surface, comprising (A) a hydroxyl-terminated polyorganosiloxane, (B) a silane having at least two silicon-bonded ketoximato groups per molecule and/or a partial hydrolysis condensate of the silane, (C) a curing catalyst, and (D) an organozirconium compound.

12 Claims, No Drawings

ROOM TEMPERATURE-CURABLE POLYORGANOSILOXANE COMPOSITION

FIELD OF THE INVENTION

The present invention relates to a room temperature-curable polyorganosiloxane composition. More particularly, this invention relates to a room temperature-curable polyorganosiloxane composition which, after being applied to joints, can give a cured elastomer having a smooth surface because a cured thin layer formed on the surface of the composition applied does not suffer cracking or wrinkling even if the joints move during the curing of the composition.

BACKGROUND OF THE INVENTION

Room temperature-vulcanizing polyorganosiloxane compositions which cure at room temperature by moisture in air to give rubber-like elastomers are well known as condensation-type room temperature-vulcanizing liquid silicone rubbers (RTV silicone rubbers), and are extensively used in various industrial fields. Such a composition consists essentially of a polyorganosiloxane base polymer having a hydroxyl group at both ends thereof, a silane crosslinking agent having hydrolyzable groups, and a curing catalyst. So-called one-package RTV silicone rubbers prepared by mixing all those ingredients and packaging the mixture to protect it from moisture are frequently used as a silicone sealant, silicone coating material, and the like in various industrial fields including manufacturing industries and the building industry and also in domestic repair applications, because cured elastomers obtained from the one-package RTV silicone rubbers have excellent properties inherent in the silicone, such as heat resistance, cold resistance, weatherability, and electrical insulation properties, and because the RTV silicone rubbers have bondability to various materials and easily cure into rubber-like elastomers by exposure to the air.

Such one-package RTV silicone rubbers have various features depending on the kind of the hydrolyzable silanes used as a crosslinking agent. Hydrolyzable silanes practically used in the one-package RTV silicone rubbers include acetoxysilanes, alkoxysilanes, aminoxysilanes, amidosilanes, enoxysilanes, and ketoximatosilanes. Of these, acetoxysilanes enable RTV silicone rubbers to have excellent curability and to show excellent bondability particularly to glasses, but there is a problem that since acetic acid is released during the curing of the rubbers, a strong irritative odor is given off and metals, marble, and other substrates are attacked. RTV silicone rubbers using alkoxysilanes have features that they are free from an irritative odor and do not attack metals, and they rarely cause polycarbonate substrates to suffer from solvent cracks. RTV silicone rubbers using aminoxysilanes or amidosilanes have a feature that cured elastomers having low modulus can be obtained, but they are defective in slow curing. RTV silicone rubbers using enoxysilanes have quick-curing properties and do not attack metals, but there is a problem that they suffer yellowing in an uncured state and they also have a cost problem. One-package RTV silicone rubbers using ketoximatosilanes as a crosslinking agent emit no irritative odor, have appropriate curability, and rarely attack metals, except copper-based metals, and such silicone rubbers are advantageously used in general-purpose industrial fields an building fields as an RTV silicone rubber having well-balanced properties and an appropriate cost.

For this reason, various studies have so far been conducted of the one-package RTV silicone rubbers using ketoximatosilanes as a crosslinking agent.

For example, JP-B-46-11272 discloses a method for imparting bondability. (The term "JP-B" as used herein means an "examined Japanese patent publication".) JP-B-62-17624 discloses a composition containing an organoaluminum as a curing catalyst. JP-A-60-161457 discloses a composition using a titanium chelate compound to improve elastic modulus and bondability. (The term "JP-A" as used herein means an "unexamined published Japanese patent application".) JP-B-63-19537 discloses a composition using a tetrafunctional oximesilane.

However, the one-package RTV silicone rubbers using ketoximatosilanes as a crosslinking agent have had a serious problem to be solved. The problem concerns the property of following up the movement of joints in the course of curing. Once a silicone sealant, which is an elastic adhesive to bond two materials, is cured, the cured sealant can satisfactorily follow up the movement of the joint within the elastic limit thereof. However, in the course of curing, a cured thin layer formed on the surface of the sealant applied at the initial stage of the curing often suffers cracking or wrinkling, and this has been a serious problem from the standpoint of sealing performance and also has not been preferable from the appearance standpoint.

The movement of joints takes place easily due to the expansion and contraction of the adherends with changing temperature, or due to vibrations, external forces, etc., and particularly in the case of buildings, it is difficult to completely prevent such joint movement. Of various one-package RTV silicone rubbers, those using ketoximatosilanes as a crosslinking agent have a tendency to undergo cracking as compared to the others, because they show a middle degree of curability and because they are in a plastic state in the course of curing.

As a means for overcoming the above problem, the present inventors proposed in JP-A-(Hei)1-121366 a composition which can effectively overcome the above problem by addition of an oragnotitanium compound. Although the cracking in the course of curing is eliminated by the addition of an oragnotitanium compound, such composition is still insufficient in heat resistance and dielectric strength. Hence, there has been a desire for an improvement of the composition for use in more severe environments that also require a higher degree of heat resistance and dielectric strength.

SUMMARY OF THE INVENTION

As a result of intensive studies to develop a composition which is free from the cracking problem and having improved heat resistance and electrical characteristics, it has been found that addition of an organozirconium compound is effective in improving not only the property of following up the movement of joints in the course of curing but also heat resistance and electrical characteristics. The present invention has been completed based on this finding.

Accordingly, an object of the present invention is to provide a room temperature-curable polyorganosiloxane composition using a ketoximatosilane as a crosslinking agent, which composition can fully follow up the movement of joints during curing and hence reduce occurrence of cracking in the course of curing and which composition also has good heat resistance and excellent electrical characteristics such as dielectric strength.

Another object of the present invention is to provide a room temperature-curable polyorganosiloxane composition which has been improved in the above properties and, in addition, is fully satisfactory in water-resistant adhesion properties and discoloration.

DETAILED DESCRIPTION OF THE INVENTION

The room temperature-curable polyorganosiloxane composition of the present invention consists essentially of (A) 100 parts by weight of a hydroxyl-terminated polydiorganosiloxane represented by the formula $$HO[R^1{}_2SiO]_nH$$

wherein $R^1$ which may be the same or different each represents a substituted or unsubstituted monovalent hydrocarbon group, and n is a number which makes the polydiorganosiloxane (A) have a viscosity as measured at 25° C. of 100 to 500,000 cP, (B) 0.5 to 25 parts by weight of a silane having at least two silicon-bonded ketoximato groups per molecule and/or a partial hydrolysis condensate of the silane, (C) 0.01 to 3 parts by weight of a curing catalyst, and (D) 0.01 to 5 parts by weight of an organozirconium compound.

The polydiorganosiloxane, component (A), used in this invention is, as described above, an α,ω-dihydroxypoly(diorgano-siloxane) represented by the formula $HO[R^1{}_2SiO]_nH$ (wherein $R^1$ and n are the same as defined above) and having a viscosity as measured at 25° C. of 100 to 500,000 cP. Examples of $R^1$ include a monovalent hydrocarbon groups such as methyl, ethyl, propyl, butyl, vinyl, or phenyl, and a substituted monovalent hydrocarbon group such as chloromethyl, cyanoethyl or 3,3,3-trifluoropropyl. It is preferred that 50% or more of the groups of $R^1$ be methyl because such polydiorganosiloxane gives a composition which cures at an appropriate rate and has an appropriate flowability before curing so that it is easily handled and because a cured elastomer obtained from the composition has good physical properties, particularly low modulus. From the standpoint of easy synthesis, it is most preferred that all the $R^1$ groups be methyl. However, in the case where heat resistance and cold resistance are particularly required, it is preferred that part of the $R^1$ groups be phenyl. The range of n varies depending on the kind of $R^1$ groups and their molar ratio, but is selected such that component (A) has a viscosity as measured at 25° C. of 100 to 500,000 cP from the standpoints of easy handling, flowability of the composition, and properties of a cured elastomer. Such viscosity range corresponds to the range of n being from 20 to 3,000 in the case where all the $R^1$ groups are methyl. Preferably, the viscosity of component (A) is between 500 and 200,000 cP. If the viscosity thereof is less than the lower limit, it is difficult to obtain good properties, while if the viscosity thereof is higher than the upper limit, the workability and curability of the composition tend to be poor.

Component (B) used in this invention is a crosslinking agent which crosslinks component (A) to provide a network structure. For this reason, a silane having at least two silicon-bonded ketoximato groups per molecule and/or a partial hydrolysis condensate of such silane is used as component (B). Examples of the silicon-bonded ketoximato groups include a dialkyl ketoximato group such as dimethyl ketoximato, diethyl ketoximato, or methyl ethyl ketoximato. Representative examples of such silane compound include methyltris(diethyl ketoximato)silane, methyltris(methyl ethyl ketoximato)silane, vinyltris(methyl ethyl ketoximato)silane, phenyltris(methyl ethyl ketoximato)silane, tetrakis(methyl ethyl ketoximato)silane, dimethylbis(methyl ethyl ketoximato)silane, vinylmethylbis(methyl ethyl ketoximato)silane, dimethylbis(dimethyl ketoximato)silane, diphenylbis(diethyl ketoximato)silane, methylbis(methyl ethyl ketoximato)methoxysilane, methylbis(methyl ethyl ketoximato)ethoxysilane, methylbis(methyl ethyl ketoximato)isopropoxysilane, and partial hydrolysis condensates thereof. Although these silane compounds having dialkylketoximato groups slightly attack copper-based metals, they do not attack the other metals, and are free from irritative odors and easily synthesized. Further, those silane compounds give a composition having well balanced properties including curing rate and bondability. Of the above-described silane compounds, component (B) is preferably either methyltris(methyl ethyl ketoximato)silane and/or a partial hydrolysis condensate thereof or vinyltris(methyl ethyl ketoximato)silane and/or a partial hydrolysis condensate thereof, from the standpoints of appropriate curability of the composition and properties of cured elastomers. The amount of the silane and/or its partial hydrolysis condensate, component (B), added to the composition is 0.5 to 25 parts by weight, preferably 3 to 10 parts by weight, per 100 parts by weight of component (A). If the amount of component (B) is smaller than 0.5 part by weight, the curability of the resulting composition is impaired because of the insufficient amount of the cross-linking agent. If the amount thereof is larger than 25 parts by weight, part of the component (B) separates out to form a film on the surface of the composition and a cured elastomer obtained from the composition has too high a modulus.

Examples of the curing catalyst (C) used in the present invention include a metal carboxylate such as iron octoate, cobalt octoate, manganese octoate, zinc octoate, tin naphthenate, tin caprylate, or tin oleate; and an organotin compound such as dibutyltin diacetate, dibutyltin dioctoate, dibutyltin dilaurate, dibutyltin dioleate, diphenyltin diacetate, dibutyltin oxide, dibutyltin dimethoxide, dibutylbis(triethoxysiloxy)tin, dioctyltin dilaurate, bisacetylacetonatotin, or bis(ethyl acetoacetato)tin. Of these, an organotin carboxylate is preferred since it shows high catalytic activity even when such is present in a slight amount, with diorganotin dicarboxylates being more preferred which give a composition having good curability.

The amount of the curing catalyst (C) added to the composition is from 0.01 to 3 parts by weight per 100 parts by weight of component (A). If the amount thereof is less than the lower limit, the curing catalyst cannot fully perform its function, so that the curing of the resulting composition takes much time and the composition's inner part far from the surface in contact with air suffers from undercure. On the other hand, an amount of the curing catalyst more than the upper limit is not preferred in that the storage stability of the composition is impaired. The more preferred amount of component (C) is from 0.1 to 2 parts by weight.

The organozirconium compound, component (D), used in this invention constitutes the main feature of the present invention. That is, component (D) serves to improve the follow-up properties of the composition comprising components (A), (B), and (C) to make the composition well follow up the movement of joints during curing, thus diminishing cracking in the course of curing. Component (D) is also effective in improving heat resistance and electrical characteristics. Examples of such organozirconium compound include zirconium butylate, zirconium acetylacetonate, acetylacetone zirconium butylate, zirconium lactate, and zirconium butylate stearate.

The organozirconium compound is preferably liquid at ordinary temperature, from the standpoint of uniform dispersion. The amount of the organozirconium compound added to the composition is 0.01 to 5 parts by weight per 100 parts by weight of component (A). If the amount thereof is less than the lower limit, the property of following up the movement of joints during curing cannot be fully exhibited. On the other hand, an amount thereof more than the upper limit is not preferred in that the viscosity of the composition becomes high to impair extrudability and workability and that the composition undergoes more severe yellowing and has poor storage stability. The more preferred amount of component (D) is from 0.05 to 3 parts by weight.

According to the present invention, fillers and other additives may be added to the composition if desired and necessary.

The fillers are reinforcing fillers and non-reinforcing fillers. Examples of reinforcing fillers include fumed silica, calcined silica, precipitated silica, fumed titanium, and fillers produced by surface-treating the above reinforcing fillers with an organochlorosilane, a polyorganosiloxane, hexamethyldisilazane, etc., to impart hydrophobicity to the fillers. Examples of non-reinforcing fillers include calcium carbonate, calcium carbonate surface-treated with an organic acid, diatomaceous earth, ground silica, aluminosilicate, magnesia, and alumina. In the case where final cured elastomers are particularly required to have a low modulus, it is preferred to use non-reinforcing fillers of the above fillers.

As additives, various kinds of additives can be added, such as a pigment, a thixotropic agent, an adhesion promoter, a viscosity modifier for improving extrusion workability, an ultraviolet stabilizer, a mildewproofing agent, a heat resistance improver, and a flame retarder.

The composition of the present invention can be obtained by mixing the above-described components (A), (B), (C), and (D), and a filler according to need, while moisture is excluded therefrom. It should, however, be noted that if all the components (A), (B), (C), and (D) are mixed at one time, a uniform mixture is somewhat difficult to obtain because the viscosity of the mixture increases abruptly to form a pseudoplasticity due to the interaction between components (A) and (D). Therefore, according to a preferred preparation method, components (A), (B), and (C), and a filler according to need, are uniformly mixed first while moisture is excluded, thereby allowing the reaction of component (A) with component (B) to proceed sufficiently, and component (D) is then added to the above-obtained mixture and the resulting mixture is uniformly mixed while moisture is again excluded therefrom. Various additives according to need may be added during the first mixing or during the second mixing.

The composition thus obtained is stored as it is in a sealed package and can be used as a so-called one-package room temperature-curable polyorganosiloxane composition, which cures only when it is exposed to atmospheric moisture when used.

Alternatively, the above-described components may be suitably stored in separate packages to be used as a two-package room temperature-curable polyorganosiloxane composition. The components thus stored are mixed before use to give the composition of this invention.

According to the present invention, a room temperature-curable polyorganosiloxane composition is provided which cures by exposure to moisture with evolution of a ketoxime compound and which can fully follow up the movement of joints in the course of curing. The composition of this invention can minimize occurrence of cracking and wrinkling in the course of curing, and further the composition has excellent heat resistance and dielectric strength and is also good in water-resistant adhesion properties and discoloration. Therefore, the composition of this invention, which can minimize occurrence of cracking and wrinkling during curing, can be advantageously used as a silicone sealant in the field of building construction. Furthermore, due to its excellent heat resistance and electrical characteristics, the composition is also most suitable for use in general-purpose industrial fields.

The composition of this invention is particularly preferably used as a silicone sealant for use in building sites where joints move considerably with changing atmospheric temperature during the curing of the sealant applied and it is practically impossible to prevent such joint movement.

The present invention will be explained below in more detail by reference to the following Examples, in which all parts are by weight and the measured values of the properties including viscosity were obtained at 25° C. Further, Me, Vi, and Ph represent methyl group, vinyl group, and phenyl group, respectively.

EXAMPLE 1

To 100 parts of $\alpha,\omega$-dihydroxypolydimethyl-siloxane having a viscosity of 200,000 cP was added 14 parts of dry-process silica having a specific surface area of 200 m²/g, and the resulting mixture was uniformly kneaded to obtain base compound B-1. On the other hand, 140 parts of methyltris(methyl ethyl ketoximato)silane, 10 parts of γ-(2-aminoethyl)aminopropyltrimethoxysilane, and 1 part of dibutyltin dilaurate were uniformly mixed to obtain crosslinking agent mixture C-1.

100 Parts of base compound B-1 was taken and 8 parts of C-1 was added thereto. The resulting mixture was uniformly kneaded while moisture was kept being excluded therefrom. The resulting composition was allowed to stand at room temperature for 4 hours while protecting the same from moisture. The organozirconium compounds shown in Table 1 were separately added to the above-obtained composition, and each of the resulting mixtures was kneaded until it became uniform while moisture was kept being excluded therefrom, and then defoamed, thereby preparing composition samples 1 to 9.

For the purpose of comparison, composition sample 10 was prepared by using an organotitanate compound in place of the organozirconium compound, and composition sample 11 was also prepared as a blank sample without adding any such compound.

Each of the above-prepared composition samples was extruded into a 2 mm thick sheet, which was then al- Example 1, for heat resistance and electrical characteristics. The results obtained are shown in Table 2.

TABLE 2

| | Initial properties | | | After 200° C., 90 days | | | Electrical properties | |
|---|---|---|---|---|---|---|---|---|
| Sample No. | Hardness (JIS A) | Tensile strength (kgf/cm$^2$) | Elongation (%) | Hardness (JIS A) | Tensile strength (kgf/cm$^2$) | Elongation (%) | Volume resistivity ($\Omega \cdot$ cm) | Dielectric break-down strength (KV/mm) |
| 11 (comparative) | 30 | 20 | 400 | 36 | 20 | 290 | $1.5 \times 10^{15}$ | 23 |
| 12 | 29 | 18 | 380 | 37 | 20 | 300 | $1.0 \times 10^{15}$ | 20 |
| 13 (comparative) | 29 | 19 | 380 | 45 | 23 | 120 | $0.2 \times 10^{15}$ | 17 | lowed to stand at 25° C., 60% RH for 168 hours so as to cure by atmospheric moisture, thereby obtaining rubber-like elastomers. On the other hand, a bend test was conducted as follows to examine the property of following up the movement of joints. The composition sample was extruded on a paper into a bead shape having a diameter of about 7 mm. The resulting test sample was allowed to stand in an atmosphere of 25° C., 60% RH and, at prescribed intervals, bent at 90° with the bead positioned outward, and whether the bead in the test sample developed a crack or not was checked. Physical properties of the above-obtained rubber-like elastomers measured according to JIS K6301) and the results of the bend test are shown in Table 1.

EXAMPLE 3

Using composition samples 2, 5, and 11 (comparative) all used in Example 1, the property of following up actual joint movement was examined by the following method in which extension of a gap due to temperature change was utilized. Each sample was applied to a joint gap having a width of 15 mm, a depth of 15 mm, and a length of 300 mm and having a triangular cross-section. 20 Minutes after application of the sample, the gap contracted by about 4%, and extended by about 8% in 60 minutes. The contraction finally came to equilibrium with the temperature when it reached to about 9%. The results obtained are shown in Table 3. In both samples

TABLE 1

| | Organozirconium compound | | Tack-free time (min) | Properties of cured elastomer | | | Bend test | |
|---|---|---|---|---|---|---|---|---|
| Sample No. | Kind | Amount (parts) | | Hardness (JIS A) | Tensile strength (kgf/cm$^2$) | Elongation (%) | After 10 min. | After 20 min. |
| 1 | Zirconium butylate | 2.5 | 15 | 31 | 19 | 370 | ○ | ○ |
| 2 | Zirconium butylate | 1.5 | 10 | 30 | 18 | 350 | ○ | ○ |
| 3 | Zirconium butylate | 1.0 | 8 | 28 | 19 | 350 | ○ | ○ |
| 4 | Zirconium butylate | 0.5 | 8 | 28 | 17 | 370 | ○ | ○ |
| 5 | Zirconium butylate | 0.05 | 6 | 28 | 16 | 340 | ○ | Δ |
| 6 | Zirconium butylate acetylacetonate | 1.0 | 8 | 28 | 18 | 340 | ○ | ○ |
| 7 | Zirconium lactate | 1.0 | 8 | 29 | 17 | 340 | ○ | ○ |
| 8 | Zirconium butylate stearate | 0.05 | 8 | 29 | 17 | 340 | ○ | ○ |
| 9 | Zirconium acetyl-acetonate | 1.0 | 8 | 28 | 16 | 350 | ○ | ○ |
| 10 (comparative) | n-Butyl titanate | 1.0 | 8 | 28 | 18 | 370 | ○ | ○ |
| 11 (comparative) | None | — | 8 | 28 | 17 | 360 | x | x |

Bend test
○: no cracking, Δ: slightly cracking, x: cracking

EXAMPLE 2

To 100 parts of base compound B-1 used in Example 1 was added 7 parts of C-1, and the resulting mixture was uniformly kneaded while moisture was kept being excluded therefrom. The resulting composition was allowed to stand at room temperature for 4 hours while moisture was kept being excluded therefrom. 0.8 Part of zirconium butylate [Zr(OC$_4$H$_9$)$_4$] was added to the above-obtained composition to prepare composition sample 12.

For the sake of comparison, 0.86 part of n-butyl titanate [(n-BuO)$_4$Ti] was added to the above-obtained composition to prepare sample 13 as a comparative composition.

The two composition samples thus obtained were evaluated, along with the blank sample 11 prepared in according to the present invention, a uniform and strong film had been formed on the surface in 60 minutes.

TABLE 3

| Sample No. | After 30 min. | After 60 min. | After 5 hours |
|---|---|---|---|
| 2 | No crack | No crack | No crack |
| 5 | No crack | No crack | No crack |
| 11 (Comparative) | Crack of about 2 mm appeared | Crack extended to about 50 mm | Crack extended to about 50 mm |

EXAMPLE 4

110 Parts of methyltris(methyl ethyl ketoximato)silane, 30 parts of vinyltris(methyl ethyl ketoximato)silane, 8 parts of γ-aminopropyltriethoxysilane, and 1 part of dibutyltin dilaurate were uniformly mixed to obtain crosslinking agent mixture C-2.

To 100 parts of base compound B-1 used in Example 1 was added 8 parts of C-2, and the resulting mixture was uniformly kneaded while moisture was kept being excluded therefrom. The resulting composition was allowed to stand at room temperature for 2 hours while protecting the same from moisture. 0.7 Part of zirconium acetylacetonate was added to the above-obtained composition, and the resulting mixture was kneaded until it became uniform while moisture was kept being excluded therefrom, and then defoamed, thereby preparing composition sample 14. This sample was subjected to physical property measurements and a bend test in the same manner as in Example 1. As a result, the cured rubber-like elastomer was found to have a hardness of 34, a tensile strength of 23 kgf/cm$^2$, and an elongation of 280%, and no crack was observed in the bend test.

While the invention has been described in detail and with reference to specific embodiments thereof, it will be apparent to one skilled in the art that various changes and modifications can be made therein without departing from the spirit and scope thereof.

What is claimed is:

1. A room temperature-curable polyorganosiloxane composition consisting essentially of
   (A) 100 parts by weight of a hydroxyl-terminated polydiorganosiloxane represented by the formula $$HO[R^1{}_2SiO]_nH$$

wherein R$^1$ which may be the same or different each represents a substituted or unsubstituted monovalent hydrocarbon group, and n is a number which makes the polydiorganosiloxane (A) have a viscosity as measured at 25° C. of 100 to 500,000 cP,
   (B) 0.5 to 25 parts by weight of a silane having at least two silicon-bonded ketoximato groups per molecule and/or a partial hydrolysis condensate of said silane,
   (C) 0.01 to 3 parts by weight of a curing catalyst which is not an organozirconium compound, and
   (D) 0.01 to 5 parts by weight of an organozirconium compound.

2. A composition as claimed in claim 1, wherein R$^1$ in component (A) is methyl, ethyl, propyl, butyl, vinyl, phenyl, chloromethyl, cyanomethyl or 3,3,3-trifluoropropyl.

3. A composition as claimed in claim 1, wherein 50% or more of R$^1$ is methyl.

4. A composition as claimed in claim 1, wherein the silicon-bonded ketoximato group in component (B) is a dialkyl ketoximato group.

5. A composition as claimed in claim 1, wherein component (B) is selected from the group consisting of methyltris(diethyl ketoximato)silane, methyltris(methyl ethyl ketoximato)silane, vinyltris(methyl ethyl ketoximato)silane, phenyltris(methyl ethyl ketoximato)silane, tetrakis(methyl ethyl ketoximato)silane, dimethylbis(methyl ethyl ketoximato)silane, vinylmethylbis(methyl ethyl ketoximato)silane, dimethylbis(dimethyl ketoximato)silane, diphenylbis(diethyl ketoximato)silane, methylbis(methyl ethyl ketoximato)methoxysilane, methylbis(methyl ethyl ketoximato)ethoxysilane, methylbis(methyl ethyl ketoximato)isopropoxysilane, and partial hydrolysis condensates thereof.

6. A composition as claimed in claim 1, wherein the amount of component (B) is 3 to 10 parts by weight per 100 parts of component (A).

7. A composition as claimed in claim 1, wherein component (C) is a metal carboxylate.

8. A composition as claimed in claim 1, wherein component (C) is an organotin compound.

9. A composition as claimed in claim 8, wherein component (C) is an organotin carboxylate and/or a derivative thereof.

10. A composition as claimed in claim 1, wherein compound (D) is selected from the group consisting of zirconium butylate, zirconium acetylacetonate, acetylacetone zirconium butylate, zirconium lactate and zirconium butylate stearate.

11. A composition as claimed in claim 1, wherein the amount of component (D) is 0.05 to 3 parts by weight per 100 parts of component (A).

12. A composition as claimed in claim 1, wherein component (B) is selected from the group consisting of methyltris (methyl ethyl ketoximato) silane, a partial hydrolysis condensate of methyltris (methyl ethyl ketoximato) silane, a mixture of methyltris (methyl ethyl ketoximato) silane and the partial hydrolysis condensate thereof, vinyltris (methyl ethyl ketoximato) silane, a partial hydrolysis condensate of vinyltris (methyl ethyl ketoximato) silane, and a mixture of vinyltris (methyl ethyl ketoximato) silane and the partial hydrolysis condensate thereof.

* * * * *